(12) United States Patent
Barwicz et al.

(10) Patent No.: US 7,315,370 B2
(45) Date of Patent: Jan. 1, 2008

(54) FLASH OPTICAL PERFORMANCE MONITOR

(75) Inventors: Andrzej Barwicz, Trois-Rivieres (CA);
Roman Z. Morawski, Warsaw (PL);
Andrzej Miekina, Warsaw (PL);
Sebastien Lesueur, Montreal (CA);
Tomasz Oleszczak, Trois-Rivieres (CA)

(73) Assignee: Measurement Microsystems A-Z Inc., Trois-Rivieres (CA)

( * ) Notice: Subject to any disclaimer, the term of this patent is extended or adjusted under 35 U.S.C. 154(b) by 391 days.

(21) Appl. No.: 10/724,356

(22) Filed: Dec. 1, 2003

(65) Prior Publication Data
US 2004/0165886 A1 Aug. 26, 2004

(30) Foreign Application Priority Data
Nov. 29, 2002 (CA) .................... 2413218

(51) Int. Cl.
G01J 3/28 (2006.01)
H04B 10/08 (2006.01)
(52) U.S. Cl. .................... 356/326; 398/27; 398/33
(58) Field of Classification Search ............. 398/25, 398/26, 27, 33, 34; 356/326, 328
See application file for complete search history.

(56) References Cited

U.S. PATENT DOCUMENTS
5,296,956 A 3/1994 Fatehi et al.
5,513,029 A 4/1996 Roberts
5,654,816 A 8/1997 Fishman (Continued)

FOREIGN PATENT DOCUMENTS
WO WO99/67609 A1 12/1999
WO WO 00/71980 A1 11/2000
WO WO 01/52451 A2 7/2001

OTHER PUBLICATIONS

Morawski, Dr. Roman Z., "The Role of Digital Signal Processing in Measurement Science" in Measurement Science: A Discussion. 2000, pp. 77-102. Ohmsha, IOS Press, Washington DC.

(Continued)

Primary Examiner—F. L. Evans
(74) Attorney, Agent, or Firm—Dowell & Dowell P.C.

(57) ABSTRACT

A flash optical performance monitor for monitoring DWDM channels is disclosed. The monitor is to assess the spectral quality of an optical signal received and to determine from changes in the spectral quality, relative to a known spectral quality indicative of an acceptable signal, an estimate of signal quality. The flash optical performance monitor comprises a spectroemetric transducer for performing a spectral decomposition of the optical signal received, and for transforming the decomposed optical signal into electrical-domain data, a memory for storing advanced digital signal processing routines, and a processor in connection with the wavelength optical unit and with the memory. The processor receives the advanced digital signal processing routines and the electrical spectral data, and applies the advanced digital signal processing routines to the electrical spectral data. Also a method for monitoring a quality of data transmission of at least one optical channel is disclosed. The method comprises the steps of capturing a spectrum of an optical signal transmitted on the at least one optical channel at an instance in time, providing a spectrum of a time-domain signal, performing an analysis of the spectrum to determine a quality of the optical signal, and from the quality of the optical signal—a quality of data transmission.

47 Claims, 6 Drawing Sheets

U.S. PATENT DOCUMENTS

| | | |
|---|---|---|
| 5,745,616 A | 4/1998 | Zirngibi |
| 5,751,767 A | 5/1998 | Tatsumi |
| 5,793,481 A | 8/1998 | Leali |
| 6,215,565 B1 | 4/2001 | Davis et al. |
| 6,310,703 B1 | 10/2001 | Alavie et al. |
| 6,317,231 B1 | 11/2001 | Al-Salameh et al. |
| 6,344,910 B1 | 2/2002 | Cao |
| 6,377,730 B1 | 4/2002 | Bergmann et al. |
| 6,396,051 B1 | 5/2002 | Li et al. |
| 6,407,376 B1 | 6/2002 | Korn et al. |
| 6,433,901 B2 | 8/2002 | Cao |
| 6,473,210 B1 | 10/2002 | Evjenth et al. |
| 6,570,686 B1 | 5/2003 | Kim |
| 6,577,786 B1 | 6/2003 | Cappiello et al. |
| 6,714,743 B2 | 3/2004 | Hsich et al. |
| 2001/0031107 A1 | 10/2001 | Bradshaw |
| 2002/0044322 A1 | 4/2002 | Blumenthal et al. |
| 2002/0063923 A1 | 5/2002 | Coppeta |
| 2002/0114029 A1 | 8/2002 | Seydnejad et al. |
| 2002/0114062 A1 | 8/2002 | Simard et al. |
| 2002/0130256 A1 | 9/2002 | Macki et al. |
| 2002/0138796 A1 | 9/2002 | Jacob |
| 2002/0141009 A1 | 10/2002 | Yu et al. |
| 2002/0141010 A1 | 10/2002 | Rodgers et al. |
| 2002/0149814 A1 | 10/2002 | Sorin |
| 2002/0168142 A1 | 11/2002 | Copner et al. |
| 2002/0172458 A1 | 11/2002 | Downie |
| 2002/0176129 A1 | 11/2002 | Dinu et al. |
| 2003/0030859 A1 | 2/2003 | Youn et al. |
| 2003/0048498 A1 | 3/2003 | Pearson et al. |
| 2003/0053163 A1 | 3/2003 | Li et al. |
| 2003/0066953 A1 | 4/2003 | Kwon |
| 2003/0099010 A1 | 5/2003 | Liu et al. |
| 2003/0112433 A1 | 6/2003 | Youn et al. |
| 2003/0123119 A1 | 7/2003 | Morozov et al. |
| 2003/0138251 A1 | 7/2003 | Jayaram et al. |
| 2003/0151789 A1 | 8/2003 | Hamoir |

OTHER PUBLICATIONS

Morawski, Dr. Roman Z. et al."Curve Fitting Algorithms vs. Neural Networks when Applied for Estimation of Wavelength and Power in DWDM Systems."

FLASH OPTICAL PERFORMANCE MONITOR

FIELD OF THE INVENTION

The present invention relates to the field of optical performance monitoring as currently applied in dense wavelength-division multiplexing.

BACKGROUND OF THE INVENTION

The recent expansion of telecommunications and computer communications, especially in the area of the Internet, has created a dramatic increase in the volume of worldwide data traffic that has placed an increasing demand for communication networks providing increased bandwidth. To meet this demand, fiber-optic networks and dense wavelength-division multiplexing (DWDM) communication systems have been developed to provide high-capacity transmission of multi-carrier signals over a single optical fiber. In accordance with the DWDM technology, a plurality of superimposed concurrent optical signals is transmitted on a single fiber, each signal having a different central wavelength. In DWDM optical networks, optical transmitters and optical receivers are tuned to transmit and receive on a specific wavelength.

With the widespread deployment of DWDM optical networks, knowing precisely what is happening at the optical layer of the network is quickly becoming a real-time issue for network management. Stable and protected DWDM links cannot be realized without real-time optical monitoring at each channel. For example, as the number of channels deployed in a DWDM optical network increases, say from 40 to 80 or 160, wavelength drifts and power variations are more likely to cause data errors or transmission failures. It is therefore becoming important for network management to dynamically monitor the performance of the communication channels in order to supply the corresponding decision-support systems with information necessary for fault detection and identification, as well as for undertaking efficient restoration actions. To achieve this goal, a new type of fiber-optic products has been developed, the so-called optical performance monitors (OPM).

An OPM consists of a spectrometric transducer and a computing means. The spectrometric transducer converts an optical signal into a digital signal representative of the spectrum of the input optical signal. The computing means processes that digital signal in such a way as to provide the final result of measurement, i.e. an estimate of the parameters of the optical signal being monitored in a DWDM system. A fractional portion of optical power, typically 2%, is tapped from the mainstream optical signal running through the optical fibre, using a tap coupler. The purpose of tapping is monitoring the optical signal while keeping the properties of the main traffic unchanged. Since the tapped signal will not be added back to the mainstream signal, there is little effect on the properties of the transmitted data, and the OPM thus provides an almost non-invasive measurement. The weak signal tapped from the mainstream optical signal is then directed to an optical unit, by which the channelized wavelength components are separated. The optical unit therefore performs a spectral decomposition of the optical signal; the results of that decomposition are detected by a detector. The detector converts optical signals into electrical signals. The electrical signals are transmitted to the electronics circuitry for processing and digital output.

The principle of operation of a spectrometric transducer may refer to various physical phenomena that make possible separation of spectral components of the input optical signal. The following devices are examples of technical means used for this purpose:

- a grating or a linear variable filter that enables separation of spectral components in space;
- a tunable filter that enables separation of spectral components in time;
- an optical heterodyne that enables shifting the spectrum in a wavelength range where its analysis is easier.

A conventional optical network performance monitor typically contains a detection element that is responsive to the combination of all signal channels carried by a main signal stream, and that is operative to generate data containing information of a collective power level provided by all channels. Such data generated in the electrical domain are not sufficient to provide detailed information of channel performance. For instance, if a power level of one of a plurality of channels of the mainstream signal is decreased while a power level of another channel is increased, a total power level measured by such device typically remains constant, thereby providing an inaccurate indication of a monitored network performance. Thus, in order to monitor a condition of an individual channel in a DWDM network, performance monitoring is preferably carried out in the optical layer. An OPM constitutes an integrated spectrometric device at a module level operating in the optical layer, the device which is capable of monitoring the performance of all individual channels, and of providing rapid channel identification, i.e. the estimates of power (P), central wavelength ($\lambda$), and optical signal-to-noise ratio (OSNR) for each channel. In order to respond to higher channel counts and transmission speed, the efforts of improving the performance of OPM have been often focused on enhancing the performance of the optical part of the spectrometric transducer which in turn resulted in a high design complexity and high manufacturing risks.

Following an RHK report ("Vendors Must Adapt Products, Strategies to Stake a Claim in Crowded OPM Market", Insight, January 2002), OPMs may be classified into three groups: Type-I OPMs, Type-II OPMS, and Type-III OPMs. A Type-I OPM is a monitor capable of providing real-time measurements of power for each DWDM channel. A Type-II OPM is a monitor capable of providing real-time measurements of power, central wavelength, and optical signal-to-noise ratio for each channel. A Type-III OPM is able, moreover, to predict indicators of the service quality provided by a DWDM system such as the bit-error rate (BER) and Q-factor (Q). Currently, those indicators can be correctly measured only with out-of-service test equipment, using a known test sequence in place of the real signal. The determination of BER and Q therefore takes place in the electrical domain, after a signal received by the DWDM receiver is passed on to the electronic circuit. Obviously, this is an expensive, time-consuming and cumbersome method.

The Type-I OPM commonly uses demultiplexing-type spectrometric transducers. Since a demultiplexing-type component, e.g. an AWG, gives a set of fixed discrete channels with a pre-defined frequency interval, i.e. channel spacing, such OPM is only able to provide power measurements at the wavelength positions corresponding to the DWDM channels. It is obvious that the measurements will be biased when there is thermal drift of some wavelength-related properties of the optical part of the OPM. A type-II OPM is able to provide more network information than a type-I OPM since it not only measures power, but also wavelength variation and OSNR.

It is not only P, λ, and OSNR of each channel that is of interest of in-service monitoring of a DWDM system, but also the bit error rate, BER, and Q, an indicator of overall quality of the signal. The conventional approach in determining BER makes use of out-of-service test equipment, and is time consuming and expensive. An obvious approach to in-service BER or Q reporting is an electrical-domain approach. It consists of tapping off a part of an optical signal, demultiplexing it through a tunable filter, detecting and then electrically regenerating it through a DWDM-type receiver. However, this approach presents various drawbacks. It is an expensive and time-consuming method since it operates in a serial manner—channel by channel—using serial channel scanning and BER or Q processing. Further, BER or Q is influenced by the receiver noise. Also, the tunable filter introduces signal distortions contributing to an increase in BER (decrease in Q) or a reduction in reliability.

Typically, in conventional applications, BER is determined by counting bits, a process which takes place in the time domain. Assuming a regular BER value in the order of $10^{-12}$, and assuming a transmission bit rate of 2.5 Gb/s, it is to be expected that—on average—every 400 s of data flow one faulty bit is to be detected. To determine BER estimate with an acceptable accuracy, a testing time of several hours is necessary.

It would be highly advantageous to have at one's disposal alternative, and simpler monitoring methods for faster fault detection and localization. Optical-domain methods, even if less accurate than electrical ones, can provide a fast, a simple, and an economical approach to reach this goal.

It would be of further advantage to have at hand a system that allows for real-time estimation of OSNR and BER or Q from the data representative of a real-world signal without the need for specific test signal sequences.

OBJECT OF THE INVENTION

It is an object of this invention to provide a transducer and a method for processing signals in which the above-mentioned disadvantages are obviated or mitigated.

SUMMARY OF THE INVENTION

In accordance with an aspect of the instant invention, there is provided a method for monitoring a quality of data transmission of at least one optical channel. The method comprises the steps of acquiring the data representative of the spectrum of a DWDM optical signal transmitted on the at least one optical channel at an instance in time, and performing an analysis of those data to determine some indicators of the quality of that signal and of the quality of data transmission.

In accordance with another aspect of the instant invention, there is provided a method for monitoring a quality of data transmission of at least one optical channel. The method comprises the steps of providing data representative of a plurality of spectra to a processor for assessing a correlation between said spectra and some indicators of the quality of the DWDM signal and/or of the quality of DWDM data transmission, determining from said correlation a quality of data transmission of the at least one optical channel.

In accordance with yet another aspect of the instant invention, there is provided a method for estimating BER or Q characterizing the quality of data transmission on at least one optical channel. The method comprising the steps of acquiring the data representative of some time-domain parameters of an DWDM optical signal transmitted on at least one optical channel at an instance in time together with the data representative of the spectrum of said signal, performing an analysis of the acquired data to estimate the value of BER or Q characterizing the quality of data transmission, wherein that estimation of BER or Q is absent counting of bit errors over a period of time sufficient to provide a statistically valid estimate of BER or Q.

In accordance with an aspect of the instant invention, there is also provided a Flash Optical Performance Monitor (Flash OPM) for monitoring the quality of a DWDM optical signal received. The Flash OPM comprises a spectrometric transducer and a computing means. The latter receives the raw data from the spectrometric transducer, and performs advanced digital signal processing of those data in order to obtain estimates of the DWDM optical signal parameters to be monitored, such as central wavelength, power and OSNR.

In accordance with an aspect of the instant invention, there is also provided an advanced version of the Flash Optical Performance Monitor (Flash OPM) for monitoring the quality of transmission in the DWDM optical systems using BER or Q as an indicator of this quality. The Flash OPM comprises a spectrometric transducer, an opto-electronic circuit providing data representative of some time-domain parameters of the optical signal, and a computing means. The latter receives the raw data from the spectrometric transducer and from the said circuit, and performs advanced digital signal processing of those data in order to obtain estimates of the DWDM optical signal parameters such as central wavelength, power, OSNR and BER or Q.

An embodiment of the present invention provides an approach to estimate BER and Q in the optical domain, as they would be recorded at the output of an ideal receiver connected to a monitored point of a network. It overcomes the above-listed drawbacks and provides a fast, simple and economical measurement technique for performance assessment in comparison to the electrical-domain classic approaches. It is applicable to in-service and out-of service approaches.

Embodiments of the present invention will now be described by way of example only with reference to the accompanying drawings, in which:

DETAILED DESCRIPTION OF THE INVENTION

The instant invention will now be described with reference to specific embodiments thereof. Of course, the invention is not restricted to a specific hardware device, but is to be utilized in connection with various hardware solutions. Various modifications to the disclosed embodiments will be readily apparent to those skilled in the art, and the general principles defined herein may be applied to other embodiments and applications without departing from the spirit and the scope of the invention. Thus, the instant invention is not intended to be limited to the embodiments disclosed, but is to be accorded the widest scope consistent with the principles and features disclosed herein.

Figure 1:
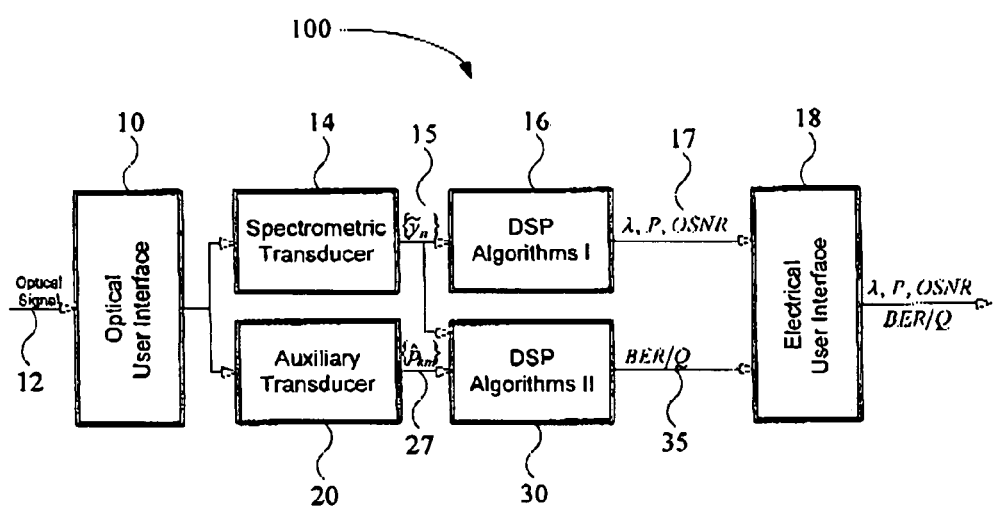
FIG. 1 is a schematic diagram of an embodiment of an OPM.

Referring now to FIG. 1, a schematic representation of an embodiment of a Flash OPM is shown. The Flash OPM 100 includes an optical user interface 10 that receives an optical input signal 12, and directs the received signal 12 to a spectrometric transducer 14. The spectrometric transducer 14 separates the input signal 12 into its spectral components and converts those components into corresponding electrical signals. The resultant data set $\{\tilde{y}_n\}$ 15 is representative of the spectrum of the optical signal 12. The spectrometric transducer 14 may utilise an optical element, such as a grating or a variable linear filters to provide a spatial separation of the components of the signal 12 and direct them to a sensor array where they are converted into corresponding electrical signals. Such transducers are well known in the optical art and need not be described in further detail.

The data set $\{\tilde{y}_n\}$ 15 is directed to a processing function 16 that implements one or more of a first set of DSP algorithms (DSP Algorithms I) for signal reconstruction and enhancement. The processor 16 may be a general purpose computer implementing algorithms contained as software instructions resident in a memory device such as a data carrier. Alternatively, the processor may be a dedicated device configured to process the data set in accordance with the selected algorithm. The DSP Algorithms I, executed by the processor 16, will typically be chosen to perform reconstruction of spectrum parameters, using a non-linear and non-stationary approach, and provides estimates 17 for P, λ, and OSNR. Optionally, the processor 16 may also implement procedures that compensate for variations in temperature, wavelength drifts, aging of the optical components, and the like to enhance the information provided by the processor.

The output from the processor 16 provides estimates 17 of the power P, wavelength λ and signal to noise ratio OSNR which are sent to an electrical user interface 18. These outputs based on the spectral analysis quality of the data signal by using one or more of the parameters. For example the channel power may be used as an indicator of quality, or the central wavelength of the channel or by the OSNR.

BER or Q depends on all the elements of a telecommunication link. The spectrum of the transmitted signal contains more information on BER or Q than the estimates 17 of P, λ, OSNR that are possibly determined on the basis of the data $\{\tilde{y}_n\}$ 15 representative of said spectrum, but—as a rule—it does not contain sufficient information on chromatic dispersion and polarization-related effects such as PMD. In order to provide a meaningful estimate of BER or Q, it is necessary to complement spectral information with some time-domain parameters $\{p_{k,m}\}$ of the optical signal 12, sensitive to those phenomena. They may be next processed using a number of algorithmic solutions, based both on statistical means of inference and on various methods of multidimensional approximation, including artificial neural networks. To this end, the received signal 12 is also directed to an auxiliary transducer 20 in parallel to the spectrometric transducer 14. The auxiliary transducer 20 processes the received signal 12 to obtain a data set $\{\hat{p}_{k,m}\}$ 27 that represents time-domain parameters $\{p_{k,m}\}$ of the signal 12.

For example, the time domain parameters of a signal $s_k(t)$ transmitted by the $k^{th}$ channel, may be defined as:

$$p_{k,m} = c \cdot \int_{t_{start}}^{t_{stop}} [s_k(t) - s_m^{th}] \cdot dt \qquad \text{Equation 1}$$

where t is time, c is a normalization constant, and $s_m^{th} \in [\inf\{s_k(t) | t \in (-\infty, +\infty) \text{ and } k=1, \ldots, K\}, \sup\{s_k(t) | t \in (-\infty, +\infty) \text{ and } k=1, \ldots, K\}]$ is the $m^{th}$ threshold value m=1, . . . M; $t_{start}$ and $t_{stop}$ are appropriately chosen limits of integration interval. It will be appreciated that many alternative sets of parameters, that carry the same information about signal distortion, may be defined and the auxiliary transducer 20 constructed accordingly to produce the data set $\{\hat{p}_{k,m}\}$ 27.

Figure 2A:
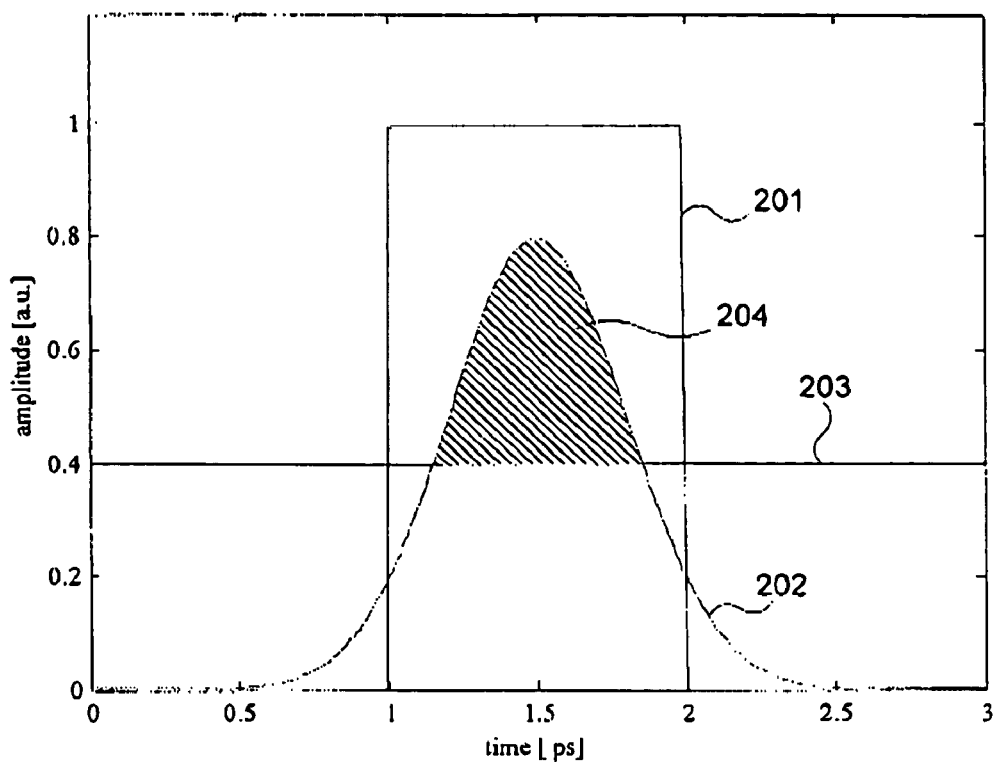
FIG. 2 is a plot of the representation of two signals provided by an auxiliary transceiver included in the OPM of FIG. 1.
Figure 2B:
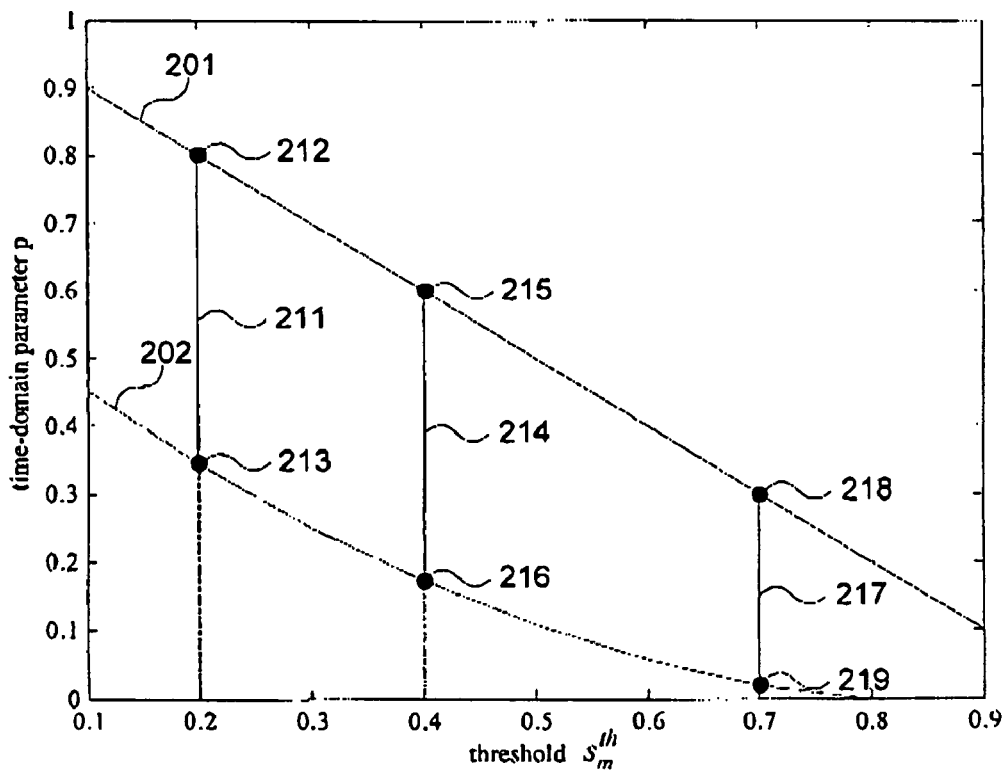

FIGS. 2a and 2b show how the signal distortion is reflected in the parameters $\{\hat{p}_{k,m}\}$ defined in the above described way. More specifically, in FIG. 2a there are shown two demodulated signals 201 and 202, signal 201 being an undistorted square pulse signal while signal 202 is the same signal after distortion. FIG. 2b shows the dependence of the time-domain parameters $\{\hat{p}_{k,m}\}$ on the threshold value $s_m^{th}$ for the undistorted and distorted signals 201 and 202, respectively. For instance, using Equation 1 with a threshold value of 0.2, the time-domain parameter $\{\hat{p}_{k,m}\}$ of distorted signal 202 may be viewed, as shown on FIG. 2a, as the area 204 under curve (signal) 202 which is above line 203 (threshold). The distorted signal 202 results in time-domain parameters $\{\hat{p}_{k,m}\}$ that vary in a non-linear fashion as a consequence of the presence of distortion, which may be seen in FIG. 2b by the difference between the time-domain parameters for the undistorted signal 201 and the distorted signal 202 for a given threshold value $s_m^{th}$. For example, it may be observed that for the threshold values 0.2, 0.4 and 0.7, the differences 211, 214 and 217 between the time-domain parameters 212, 215 and 218 of the undistorted signal 201 and the time-domain parameters 213, 216 and 219 of the distorted signal 202, respectively, are not equal. The non linearities may be used to provide an indication of the nature and degree of distortion to which the signal has been subjected. As such, signal 202 is processed so as to identify non-linearities relative to an ideal signal 201, and from these non-linearities provide an assessment of the degree or type of the distortion. Thus, the time-domain parameters $\{\hat{p}_{k,m}\}$ form a function that recognizes the shape of the distorted signal 202 and is indicative of the distortion, which may not be as readily apparent from the spectrum data set $\{\tilde{y}_n\}$.

Figure 3:
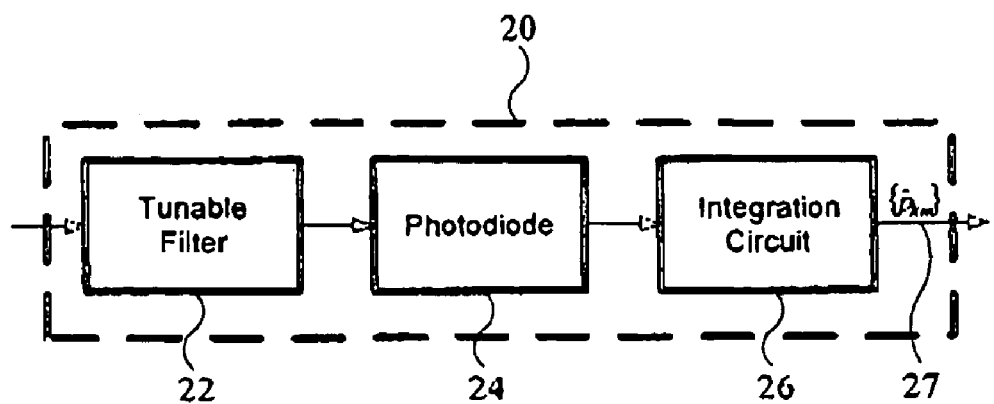
FIG. 3 is a schematic diagram of the auxiliary transducer included in the OPM of FIG. 1.

In using the parameters defined above, the estimates $\{\hat{p}_{k,m}\}$ 27 may be obtained by an auxiliary transducer 20, shown in FIG. 3, composed of a tunable filter 22 followed by a high-speed photodiode 24. The output of the diode 24 is processed by an integration circuit 26 to provide the output $\{\hat{p}k,m\}$ 27. The tunable filter 22 is used to select a channel so that the associated photodiode 24 reproduces $s_k(t)$ by demodulation, and the integration circuit performs the operation such as that defined by Equation 1 for each of the selected thresholds.

The output 27 and 15 of the auxiliary transducer 20 and the spectrometric transducer 14, respectively, are provided to a processor 30 that implements selected ones of a second set of DSP algorithms (DSP Algorithms II) to extract further information from the received signal 12. The processor 30 may be a specific hardware implementation structured to perform a specific selected algorithm or may be a general-purpose computing device that operates upon the data sets 15 and 27 in accordance with programmed instructions contained on a memory device. The processor 30 executes one or more of the second set of selected DSP algorithms (DSP Algorithms II) to analyse the data $\{\tilde{y}_n\}$ 15 and $\{\hat{p}_{k,m}\}$ 27, and provide an estimate 35 for BER or Q. The estimate 35 is next transferred to the electrical user interface 18. The electrical user interface 18 transfers the estimates 17 and 35 of P, λ, OSNR, and BER or Q to the user that is assessing the performance of a particular channel, and to monitor the quality of a signal transmitted on said channel.

The interface 18 may function to provide readouts of the parameters being monitored but preferably operates to provide a visual indication of the departure of the parameters from predetermined acceptable levels. Thus the interface may monitor over a period of time the quality factor Q of the respective channels for a period of time and provide a signal indicating if the quality on one or more channels has varied from an acceptable value to an unacceptable value. Similarly, each channel may be monitored for BER and an indication provided if the BER has varied from an acceptable to an unacceptable value. By implementing the monitoring with the auxiliary transducer and processor, it is anticipated that the changes value may detected within one second.

Figure 4:
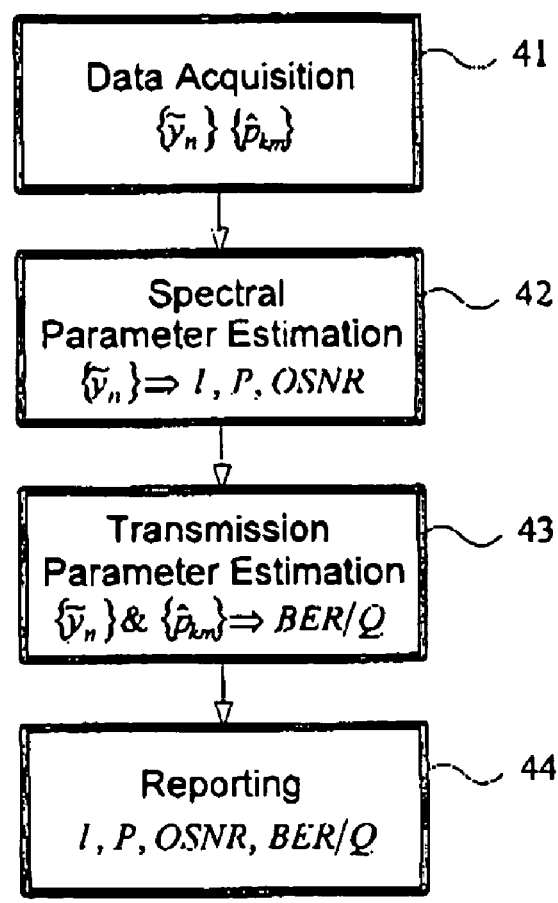
FIG. 4 is a flow diagram illustrating the operation of the Flash of FIG. 1.

The processing of the received signal 12 is depicted in the flow diagram of FIG. 4. In a first step 41, the data $\{\tilde{y}_n | n=1, \ldots, N\}$ representative of the spectrum of a total DWDM signal are acquired, as well as the estimates $\{\hat{p}_{k,m} | k=1, \ldots, K; m=1, \ldots, M\}$ of some time-domain parameters $\{p_{k,m} | k=1, \ldots, K; m=1, \ldots, M\}$ of that signal, that are provided by the auxiliary transducer 20 and carry auxiliary information about signal distortion. The first set of DSP algorithms (DSP Algorithms I), which will be described further below, is used to determine the estimates 17 of the parameters P, λ, and OSNR for each channel—on the basis of the data $\{\tilde{y}_n\}$ 15, step 42. In step 43, those data $\{\tilde{y}_n\}$ 15 are used again, this time together with the estimates $\{\hat{p}_{k,m}\}$ 27 of the time-domain parameters, to determine the estimate 35 of BER or Q. In this step, the second set of algorithms (DSP Algorithms II), which will be described further below, is used. In a last step 44, there are reported the estimates 17 and 35 of p, λ, OSNR and BER or Q, useful for a network monitoring system.

The method, as illustrated in FIG. 4, provides a number of advantages compared to traditional out-of-service BER-test techniques. The method is an optical-layer testing method, which is also an in-service method. A BER test of all channels is performed in parallel and thus simultaneously. The method provides a low-cost solution as well as a fast solution to the problem of in-service monitoring of DWDM networks. Test times, according to the method described in FIG. 4, remain substantially constant as channel counts increase. Also, the described method does not depend on the transmission protocol, on the data format or on the generation of complex test signals.

The first subset of algorithms (DSP Algorithms I), used for determination of the estimates 17 of the parameters P, λ, and OSNR, contains the algorithms for spectrum reconstruction and estimation of spectrum parameters that are well known in the art, for example those described in detail in U.S. Pat. No. 5,991,023 to Morawski et al., issued Nov. 23, 1999, and in U.S. Pat. No. 6,002,479 to Barwicz et al., issued Dec. 14, 1999. These may be, in particular, the algorithms of spectrum reconstruction based on the parameterization of the spectrum of the form:

$$x(\lambda) = \sum_{k=1}^{K} [a_{1,k} v(\lambda - l_k) + a_{2,k} v_\Pi(\lambda - l_k)]$$

where:
$a_1 = [\alpha_{1,1} \ldots \alpha_{1,k}]^T$, $a_2 = [\alpha_{2,1} \ldots \alpha_{2,K}]^T$, $l = [l_1 \ldots l_k]^T$ be estimated;
$l = [l_1 \ldots l_k]^T$ is the vector of ITU-recommended channel wavelength values;
$v(\lambda)$ is a function modelling the normalized spectrum of a monitored telecommunication channel;
$v_\pi(\lambda)$ is a function modelling a normalized pedestal, accompanying the spectrum of a monitored telecommunication channel, in the simplest case:

$$v_\Pi(\lambda) = \frac{1}{\Delta\lambda_\Pi} \left[ 1\left(\lambda - \frac{\Delta\lambda_\Pi}{2}\right) - 1\left(\lambda + \frac{\Delta\lambda_\Pi}{2}\right) \right].$$

In this case, the estimates 17 of the channel parameters P, λ, OSNR may be calculated directly from the estimates of $a_1$, $a_2$, and $l$.

The second set of DSP algorithms (DSP Algorithms II), used for extracting useful BER and Q information, may be constructed according to the following principles. A spectrometric transducer 14 converts input optical signal into a set of data $\{\tilde{y}_n\}$ 15 representative of the spectrum of this signal. The spectrometric transducer 14 is, for example, part of a Type-II FLASH device, but it is not restricted to such devices and applications. An output-related discretisation of a wavelength axis is defined by a sequence $\{\lambda_n\}$ such that $\lambda_{min} = \lambda_1 < \lambda_2 < \ldots < \lambda_{N-1} < \lambda_N = \lambda_{max}$ where N is a number of data. For example, in a Type-II Flash OPM having a detector array, such as the one described in FIG. 1, N represents a number of photodiodes in the detector array. Thus, the average interval between wavelengths, in the given example equivalent to the distance two neighbouring photodiodes are adjusted to each other, is given by $\Delta\lambda = (\lambda_{max} - \lambda_{min})/(N-1)$. It is assumed that the data $\{\tilde{y}_n\}$ 15 represent a spectrum of K channels combined in a DWDM system under consideration. A subsequence of data $\{\tilde{y}_n | n = N_{k,min}, \ldots N_{k,max}\}$ is used, together with the information indicative of the signal distortion within the time-domain parameters $\{\hat{p}_{k,m}\}$ 27 provided by the auxiliary transducer 20, for estimation of BER or Q. Further, the length of this subsequence is variable, and amounts for example to 3, 4, 5, 6 or more elements. In the following, for the sake of simplicity, considerations are limited to one channel only, and the symbol $\{\tilde{y}_n\}$ is used for denoting this subsequence. A person of skill in the art is able to extend the concept with ease to any other number of channels.

The problem of determining BER or Q may be solved in a broad context of algorithmic options, which are derived from ideas of quasi-dynamic measurand reconstruction that is a well-established and well-recognised methodology in digital signal processing, as for example illustrated in the paper "The Role of Digital Signal Processing in Measurement Science" published in "*Measurement Science—A Discussion*" (Ohmsha Press Pub., Tokyo 2000, pp. 77-102). High redundancy of measurement information in raw measurement data is the main distinctive feature of any problem of quasi-dynamic measurand reconstruction. Consequently, implicit or explicit compression of data is present in any procedure for solving such a problem. The value of a scalar measurand x, BER or Q, is estimated on the basis of a subsequence of data $\{\tilde{y}_n\}$ 15 representative of the channel spectrum and the parameters $\{\hat{p}_{k,m}\}$27 to which the measurand is approximately related.

Figure 5:
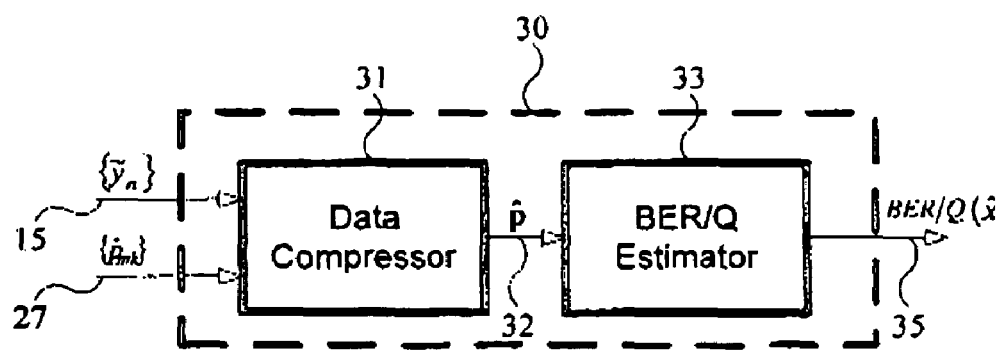
FIG. 5 is a schematic diagram illustrating the methodology of quasi-dynamic measurand reconstruction.

A large family of DSP methods for estimation of BER or Q may be derived from the general methodology for solving problems of quasi-dynamic measurand reconstruction. This methodology consists of two steps: compression of the data $\{\tilde{y}_n\}$ 15 and $\{\hat{p}_{k,m}\}$ 27, i.e. transformation of the data $\{\tilde{y}_n\}$ 15 and $\{\hat{p}_{k,m}\}$ 27 into an estimate $\hat{p}$ 32 of a vector of informative parameters p, $\{\tilde{y}_n\}$, $\{\hat{p}_{k_n}\} \rightarrow \hat{p}$, and subsequent estimation of x on the basis of $\hat{p}$, $\hat{p} \rightarrow \hat{x}$. This methodology is illustrated in the schematic diagram shown in FIG. 5. Inputs containing the subsequence $\{\tilde{y}_n\}$ 15 and $\{\hat{p}_{k,m}\}$ 27 are provided to a data compressor 31. The data compressor 31 compresses the subsequence $\{\tilde{y}_n\}$ 15 and $\{\hat{p}_{k,m}\}$ 27 to obtain a set containing an estimate $\hat{p}$ 32, which is provided to a BER or Q estimator 33. When properly calibrated, the BER or Q estimator 33 responds with an output set 35 containing an estimate 35 $\hat{x}$ of x, i.e. of BER or Q. A complexity of the method illustrated in FIG. 5 depends on a number of informative parameters, i.e. the dimension of the vector $\hat{p}$ 32. The greater the number of informative parameters, the more time is required both for calibration and for BER or Q estimation.

Figure 6:
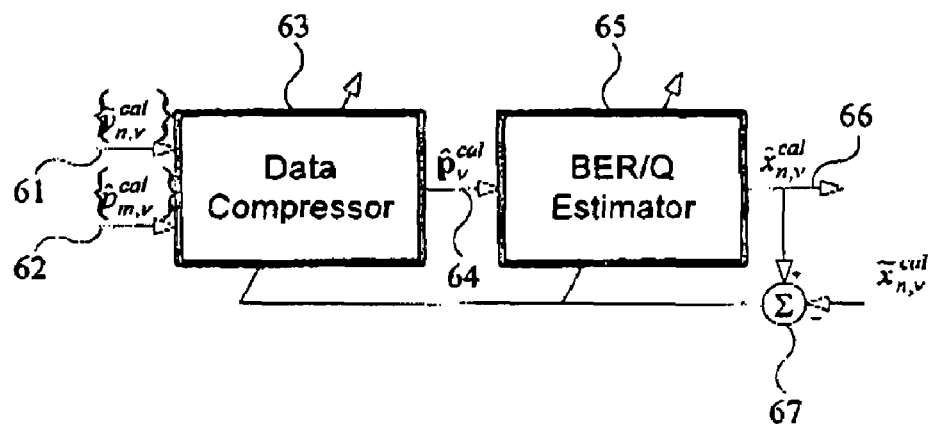
FIG. 6 is a schematic diagram illustrating the methodology of quasi-dynamic system calibration.

The calibration of the Flash OPM 100 is an important step in the methodology described above. It is to be performed on the basis of reference data, which are structured as $\tilde{D}^{cal} = \{\tilde{x}_v^{cal}, \{\tilde{y}_{n,v}^{cal}\} \& \{\hat{p}_{m,v}^{cal}\} | v=1, \ldots, N^{cal}\}$. In FIG. 6, a schematic diagram for a method of calibration is outlined. An input containing the subsequence $\{\tilde{y}_{n,v}^{cal}\}$ 61 and $\{\hat{p}_{m,v}^{cal}\}$ 62 is provided to a data compressor 63. The data compressor 63 compresses the subsequence $\{\tilde{y}_{n,v}^{cal}\}$ 61, and computes an estimate of a vector of informative parameters $\hat{p}_v^{cal}$ 64, corresponding to reference values $\tilde{x}_{n,v}^{cal}$, on the basis of $\{\tilde{y}_{n,v}^{cal}\}$ and $\{\hat{p}_{m,v}^{cal}\}$ for $v=1, \ldots, N^{cal}$. The set 64 containing the parameters $\hat{p}_v^{cal}$ is provided to a BER or Q estimator 65. The BER or Q estimator 65 responds with an output set 66 containing a datum $\hat{x}_{n,v}^{cal}$ 66. In a data adjustor 67, the data $\hat{x}_{n,v}^{cal}$ 66 and $\tilde{x}_{n,v}^{cal}$ are compared. The result of this comparison is provided as feedback to the data compressor 62 and the BER or Q estimator 65, where in turn this information is utilized in constructing an approximation of the relationship p→x using a set of input-output pairs: $\{\hat{p}_v^{cal}, \tilde{x}_v^{cal} | v=1, \ldots, N^{cal}\}$.

A large variety of algorithms is possibly generated by combining various techniques of data compression with various types of approximators. For example, the following techniques of data compression are optionally used: principal component analysis, computation of inner products of the data $\{\tilde{y}_n\}$ 15 and $\{\hat{p}_{k,m}\}$ 27 and linearly independent sequences $\{e_{j,n} | j=1, \ldots, J\}$, approximation of the spectrum $y(\lambda)$ on the basis of $\{\tilde{y}_n\}$ 15 and $\{\hat{p}_{k,m}\}$ 27 using a parameterised function $\hat{y}(\lambda_n; a)$ with a being a vector of parameters, and computation of the moments of the spectrum $y(\lambda)$ on the basis of $\{\tilde{y}_n\}$ 15. In the considered case, an application-specific vector of informative parameters could contain estimates 17 of P, $\lambda$, and OSNR, the estimates determined on the basis of $\{\tilde{y}_n\}$ 15 and $\{\hat{p}_{k,m}\}$ 27. The most evident candidate for the measurand estimator, i.e. the BER or Q estimator, is a neural network being a universal approximator. Alternatively, B-splines are to be considered as measurand estimators. A person of skill in art will be able to suggest further methods of data compression and final measurand estimation.

Figure 7:
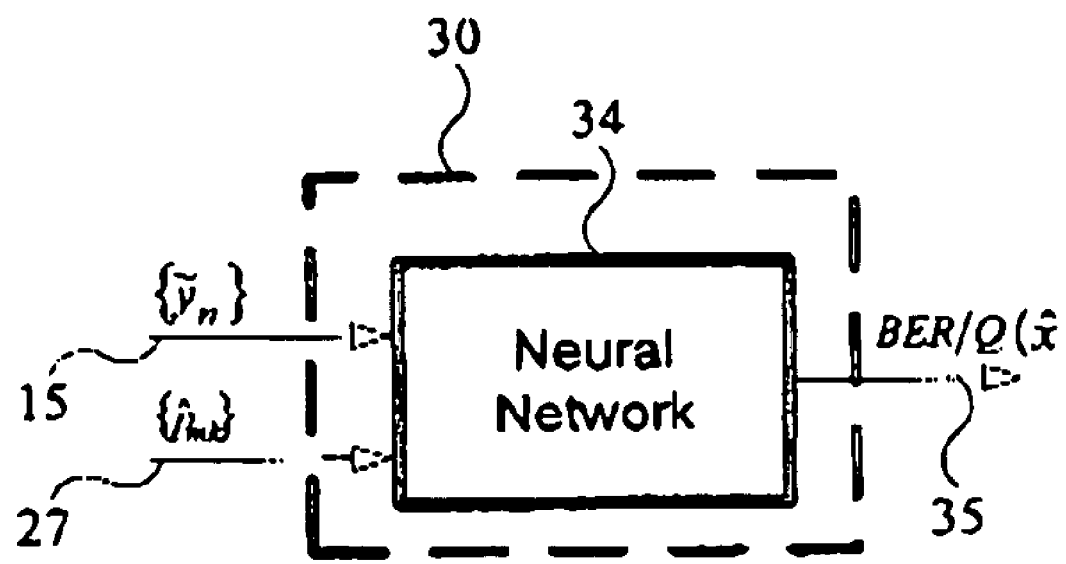
FIG. 7 is a flow diagram illustrating the functionality of a neural network to be used for the determination of BER and/or Q.

For example, following a straightforward approach, a Radial Basis Functions (RBF) neural network 34 is designed as illustrated in the schematic diagram shown in FIG. 7. This particular network performs both the function of data compressor and of BER/Q estimator. The neural network 34 receives as inputs data sets $\{\tilde{y}_n\}$ 15 and $\{\hat{p}_{k,m}\}$ 27. The neural network 34 is trained to respond with an estimate $\hat{x}$ 35 of x (BER or Q) on the basis of $\{\tilde{y}_n\}$ and $\{\hat{p}_{k,m}\}$. It is important for training the network that the data set $\{\tilde{y}_n\}$ 15 stem from a low-resolution spectrometric transducer and the parameters $\{\hat{p}_{k,m}\}$ 27 from an auxiliary transducer. The sets of data used for training preferably represent a telecommunication signal distorted in various ways by its propagation through optical elements such as fibers, amplifiers, and filters. Instead of a RBF neural network, any other universal approximator may be used, e.g. another type of neural network or a multi-dimensional spline function. Instead of one neural network a cascade of two neural networks may be designed: the first to perform the function of data compressor, the second—of BER/Q estimator.

Figure 8:
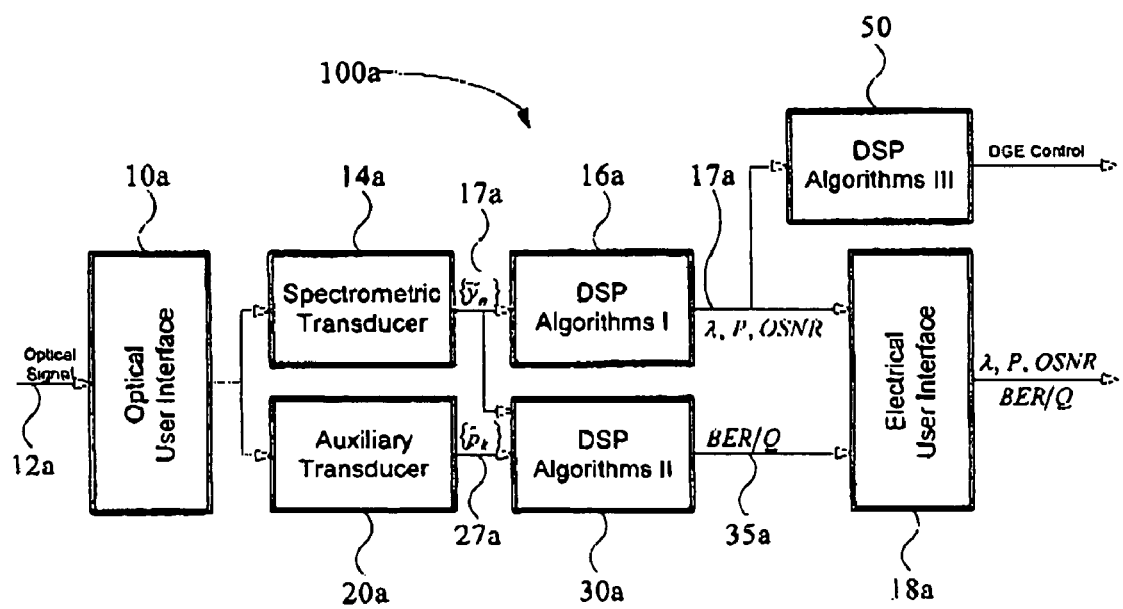
FIG. 8 shows a schematic diagram of another embodiment of the FLASH of FIG. 1.

Referring now to FIG. 8, a schematic representation of another embodiment of the Flash OPM 100*a* is shown, in which the Flash OPM 100*a* is adapted so as to provide data suitable for use in a special application related to performance monitoring, viz. controlling a Digital Gain Equalizer (DGE). Like components will be described with like reference numerals with a suffix "a" added for clarity. The Flash OPM 100*a* includes an optical user interface 10*a*, that provides received signal 12*a* to a spectrometric transducer 14*a*. A processor 16*a* implements a first set of DSP algorithms (DSP Algorithms I). The output of the processor 16*a* is applied to the electrical user interface 18*a* and to a further processor 50 that implements a further set of DSP algorithms (DSP Algorithms III). The received signal 12*a* is also fed to an auxiliary transducer 20*a* and to the processor 30*a* for implementing the second set of DSP algorithms (DSP Algorithms II) as described above to obtain estimate 35*a* of BER or Q. The processor 50 utilises the DSP algorithms (DSP Algorithms II) to process the estimates 17*a* of P, $\lambda$, and OSNR according to information suitable for control of DGE. A person of skill in the art easily envisions further applications of DSP-type processing units. These applications are feasible, since the spectrum retrieved by the spectrometric transducer, such as 14, 14*a*, and processed by the processors 16, 16*a*, inherently contain relevant and significant information characterizing the input optical signal.

The data processing performed by optical performance monitors, such as 100 and 100*a* takes place within a time range of 50-200 milliseconds. This allows for in situ monitoring of an optical signal transmitted on a given channel, and for immediate undertaking of measures to reroute an optical signal to an alternative channel, once a too high value of BER or too low value of Q is detected. Assuming a response time of the monitor of 50 milliseconds, and a transmission bit rate of 2.5 Gb/s, a data buffer of 1.6 MB is sufficient to ensure that no data are lost during the detection of a fault-signal ling BER or Q value and rerouting of an optical signal. By shifting the determination of BER or Q values from the electrical domain into the optical domain, a continuous, real-time quality assessment of an optical channel is possible, and it is further possible to route data transmission without a significant loss of information.

Although the present invention has been described with respect to specific embodiments thereof, various changes and modifications are optionally carried out by those skilled in the art without departing from the scope of the invention. Therefore, it is intended that the present invention encompass such changes and modifications as fall within the scope of the appended claims.

What is claimed is:

1. An optical performance monitor for monitoring an optical signal and providing an estimate of a predetermined parameter x of that signal, the optical performance monitor comprising:
   a spectrometric transducer element for performing a spectral decomposition of an incident optical signal, and for transforming the decomposed optical signal into a first data set representative of the spectrum of said optical signal;
   an auxiliary transducer to receive said optical signal and provide as an output a second data set representative of time-domain parameters of said signal; and
   a processor to receive each of said data sets and to apply thereto digital signal processing routines to obtain estimates of said predetermined parameter.

2. A flash optical performance monitor according to claim 1 including a further processor for applying signal reconstruction algorithms to said first data set.

3. An optical performance monitor according to claim 1 wherein said digital signal processing routines include routines for performing the steps of determining a set of data $\{\tilde{y}_n\}$ representative of said incident optical signal, and obtaining an estimate $\tilde{x}$ of a predetermined parameter x from the set of data $\{\tilde{y}_n\}$, the predetermined parameter x describing a quality of the optical signal received.

4. A flash optical performance monitor according to claim 3 wherein the estimate $\tilde{x}$ is determined by a comparison of the set of data $\{\tilde{y}_n\}$ with an ideal set of data.

5. A flash optical performance monitor according to claim 4 wherein the comparison is performed using a processor for computing the estimate $\tilde{x}$ from an existing correlation of the predetermined parameter x and the set of data $\{\tilde{y}_n\}$.

6. A flash optical performance monitor according to claim 5 wherein the processor for computing the estimate i from an existing correlation of the predetermined parameter x and the set of data $\{\tilde{y}_n\}$ is a neural network.

7. An optical performance monitor according to claim 4 wherein the comparison uses reference calibration data, the reference calibration data being structured as $\tilde{D}^{cal} = \{\tilde{x}_v^{cal}, \{\tilde{y}_{n,v}\}|v=1,2,\ldots,N^{cal}\}$.

8. An optical performance monitor according to claim 1, wherein a quality of data transmission by said optical signal is obtained from the spectral quality of that signal.

9. A flash optical performance monitor according to claim 8, wherein a quality of an optical signal is characterized by the channel power.

10. A flash optical performance monitor according to claim 8, wherein a quality of an optical signal is characterized by the channel central wavelength.

11. A flash optical performance monitor according to claim 8, wherein a quality of an optical signal is characterized by the channel optical signal-to-noise ratio.

12. A flash optical performance monitor according to claim 8, wherein a quality of data transmission is characterized by a quality factor Q.

13. A flash optical performance monitor according to claim 8, wherein a quality of data transmission is characterized by a bit-error rate BER.

14. A method for monitoring a quality of data transmission of at least one optical channel, the method comprising the steps of:
    determining a first data set representative of a spectrum of an optical signal transmitted on the at least one optical channel at an instance in time;
    obtaining a second data set from said signal indicative of time domain parameters of said signal;
    performing an analysis of said data sets to determine an estimate of a predetermined parameter x of said optical signal and providing an output representative of said parameter to indicate a quality of data transmission.

15. A method for monitoring a quality of data transmission according to claim 14, wherein said predetermined parameter of said the data transmission describes a bit-error rate BER of the data transmission.

16. A method for monitoring a quality of data transmission according to claim 14, wherein the quality of the data transmission describes a quality factor Q of the data transmission.

17. A method for monitoring a quality of data transmission according to claim 4, wherein the step of spectrum analysis to determine a quality of the optical signal comprises the steps of:
    performing a spectral decomposition of the optical signal;
    determining a set of data $\{\tilde{y}_n\}$ representative of a result of said spectral decomposition; and
    obtaining an estimate of a predetermined parameter x, x being either one of BER and Q, from the set of data $\{\tilde{y}_n\}$ the predetermined parameter x describing a quality of the optical signal.

18. A method for monitoring a quality of data transmission according to claim 17; wherein the estimate $\tilde{x}$ is determined by a comparison of the set of data $\{\tilde{y}_n\}$ with an ideal set of data.

19. A method for monitoring a quality of data transmission according to claim 18, wherein the comparison is performed using a processor for computing the estimate $\tilde{x}$ from an identified correlation of the predetermined parameter x and the set of data $\{\tilde{y}_n\}$.

20. A method for monitoring a quality of data transmission according to claim 19, wherein the processor for computing the estimate $\tilde{x}$ from an identified correlation of the predetermined parameter x and the set of data $\{\tilde{y}_n\}$ is a neural network.

21. A method for monitoring a quality of data transmission according to claim 18, wherein the comparison uses reference calibration data, the reference calibration data being structured as $\tilde{D}^{cal} = \{\tilde{x}_v^{cal}, \{\tilde{y}_{n,v}\}|v=1,2,\ldots,N^{cal}\}$.

22. A method for monitoring a quality of data transmission according to claim 14, wherein the quality of more than one optical channel is monitored by a same process of spectrum analysis.

23. A method for monitoring a quality of data transmission according to claim 15, wherein the quality factor Q of at least one optical channel is monitored over a period of time, and wherein an indication signal is provided, the indication signal indicative of at least one optical channel on which the quality factor Q has varied from an acceptable value to an unacceptable value.

24. A method for monitoring a quality of data transmission according to claim 16,
wherein the bit-error rate BER of at least one optical channel is monitored over a period of time, and wherein an indication signal is provided, the indication signal indicative of at least one optical channel on which the bit-error rate BER has varied from an acceptable value to an unacceptable value.

25. A method for monitoring a quality of data transmission according to claim 24,
wherein the indication signal is provided within one second after the bit error rate BER has varied from an acceptable value to an unacceptable value.

26. A method for monitoring a quality of data transmission of at least one optical channel, the method comprising the steps of:
providing a plurality of spectra to a processor for assessing a correlation between said spectra;
determining from said correlation a quality of data transmission of the at least one optical channel; and
providing an output representative of said quality to indicate a quality of data transmission.

27. A method for monitoring a quality of data transmission according to 26,
wherein the quality of the data transmission describes a quality factor Q of the data transmission.

28. A method for monitoring a quality of data transmission according to claim 26,
wherein the quality of the data transmission describes a bit error rate BER of the data transmission.

29. A method for monitoring a quality of data transmission according to claim 26,
wherein the correlation is established by use of a neural network.

30. A method for monitoring a quality of data transmission according to claim 26,
wherein the correlation is established by use of reference calibration data.

31. A method for monitoring a quality of data transmission according to claim 26,
wherein the quality of more than one optical channel is monitored by a same process of correlation.

32. A method for monitoring a quality of data transmission according to claim 27,
wherein the quality factor Q of at least one optical channel is monitored over a period of time, and wherein an indication signal is provided, the indication signal indicative of at least one optical channel on which the quality factor Q has varied from an acceptable value to an unacceptable value.

33. A method for monitoring a quality of data transmission according to claim 32,
wherein the indication signal is provided within one second after the quality factor Q has varied from an acceptable value to an unacceptable value.

34. A method for monitoring a quality of data transmission according to claim 28,
wherein the bit error-rate BER of at least one optical channel is monitored over a period of time, and wherein an indication signal is provided, the indication signal indicative of at least one optical channel on which the bit-error rate BER has varied from an acceptable value to an unacceptable value.

35. A method for monitoring a quality of data transmission according to claim 34,
wherein the indication signal is provided within one second after the bit-error rate BER has varied from an acceptable value to an unacceptable value.

36. A method for estimating a bit-error rate BER of data transmission on at least one optical channel, the method comprising the steps of:
capturing a spectrum of a optical signal transmitted on the at least one optical channel at an instance in time;
performing an analysis of said spectrum to determine a quality of the optical signal; and
estimating from the quality of the optical signal a bit-error rate BER of data transmission,
wherein the bit-error rate BER is estimated absent a summation of bit errors over a period of time sufficient to provide a statistically valid estimate of a bit-error rate BER.

37. A method for estimating a bit-error rate BER according to claim 36,
wherein the instance of time is less than a time period during which a number of bits are transmitted, within which an acceptable bit count will show at least one error.

38. A method for estimating a bit-error rate BER according to claim 36,
wherein the step of spectrum analysis to determine a quality of the optical signal comprises the steps of:
performing a spectral decomposition of the optical signal;
determining a set of data $\{\tilde{y}_n | n=1, \ldots, N\}$ representative of a result of said spectral decomposition; and
obtaining an estimate $\tilde{x}$ of a predetermined parameter x from the set of data $\{\tilde{y}_n | n=1, \ldots, N\}$ the predetermined parameter x describing a quality of the optical signal.

39. A method for estimating a bit-error rate BER according to claim 38;
wherein the predetermined parameter x is determined by a comparison of the set of data $\{\tilde{y}_n | n=1, \ldots, N\}$ with an ideal set of data.

40. A method for estimating a bit-error rate BER according to claim 39,
wherein the comparison is performed using a processor for computing the estimate $\tilde{x}$ from an existing correlation of the predetermined parameter x and the set of data $\{\tilde{y}_n | n=1, \ldots, N\}$.

41. A method for estimating a bit-error rate BER according to claim 40,
wherein the correlation processor is a neural network.

42. A method for estimating a bit-error rate BER according to claim 39,
wherein the comparison uses reference calibration data, the reference calibration data being structured as $\tilde{D}^{cal} = \{\tilde{x}_v^{cal}, \{\tilde{y}_{n,v}\} | v=1,2,\ldots, N^{cal}\}$.

43. A method for estimating a bit-error rate BER according to claim 35,
wherein the bit-error rate BER of more than one optical channel is estimated by the same process of spectrum analysis.

44. An optical performance monitor for monitoring an optical signal and providing an estimate of a predetermined parameter x of that signal, the optical performance monitor comprising:
a spectrometric transducer element for performing a spectral decomposition of the incident optical signal, and for transforming the decomposed optical signal into a first data set representative of the spectrum of said optical signal and a processor to receive said data set, said processor applying thereto digital signal processing routines for signal reconstruction to obtain therefrom estimates of at least one of said predetermined parameters of power, wavelength or optical signal to noise ratio.

45. An optical performance monitor according to claim 44 wherein an estimate of optical power is used to monitor quality of the signal.

46. An optical performance monitor according to claim 44 wherein optical signal quality is characterised by channel central wavelength.

47. An optical performance monitor according to claim 44 wherein optical signal to noise ratio is used to estimate signal quality.

* * * * *